United States Patent
Crane

[15] 3,689,961
[45] Sept. 12, 1972

[54] METHOD AND APPARATUS FOR EVISCERATING POULTRY

[72] Inventor: Edward J. Crane, Ottumwa, Iowa

[73] Assignee: International Agri-Systems, Inc., Madison, Ottumwa, Iowa

[22] Filed: Feb. 8, 1971

[21] Appl. No.: 113,276

Related U.S. Application Data

[63] Continuation-in-part of Ser. No. 9,180, Feb. 6, 1970, abandoned.

[52] U.S. Cl..........................................17/45, 17/11
[51] Int. Cl...............................................A22c 21/06
[58] Field of Search....................................17/11, 45

[56] References Cited

UNITED STATES PATENTS 3,474,492  10/1969  Viscolosi......................17/45
3,104,418  9/1963  Segur............................17/11
3,555,593  1/1971  Scheier........................17/45

*Primary Examiner*—Lucie H. Laudenslager
*Attorney*—Price, Heneveld, Huizenga & Cooper

[57] ABSTRACT

An eviscerating apparatus utilizing two opposed spoon members adapted for insertion into the body cavity of the bird to be eviscerated. The spoons are separately pivotally mounted for rotation in a vertical plane upon a carriage attached to a conveyor. Cam followers on the spoon members and associated cam tracks cause the spoons to separate, to remove the viscera from the bird and then partially close to permit an overhead carrier to lift the now eviscerated fowl from the spoons. A scraper pushes the viscera off the lower spoon and it is carried with the bird to the inspection station.

16 Claims, 10 Drawing Figures

United States Patent
Crane
[15] 3,689,961
[45] Sept. 12, 1972
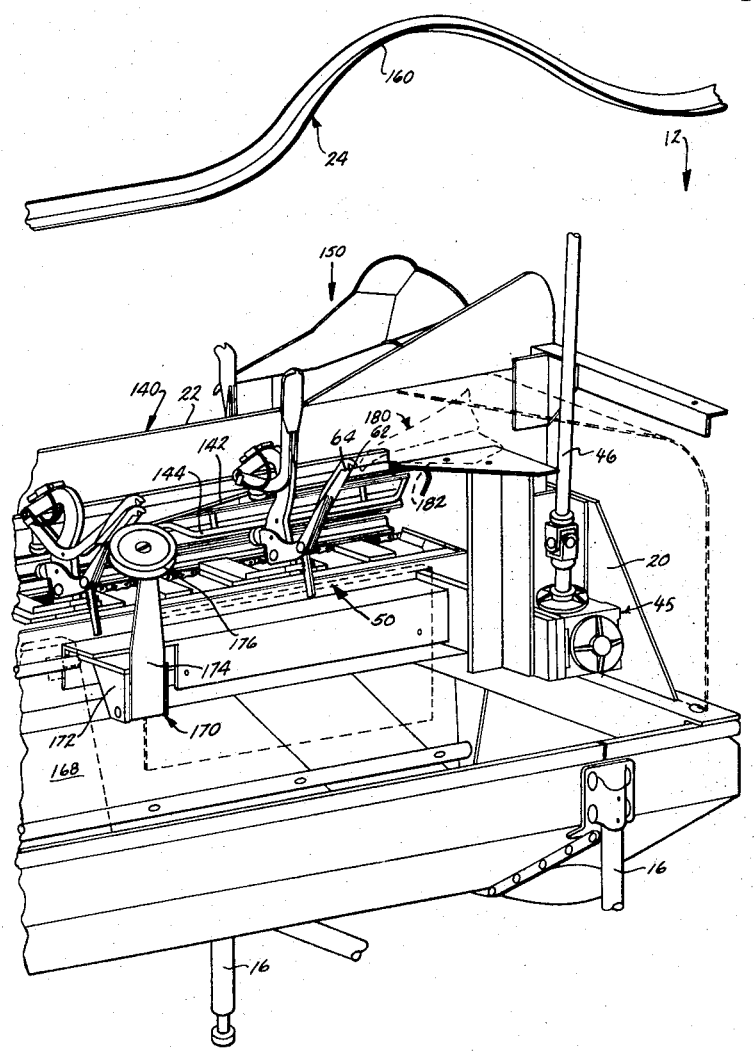

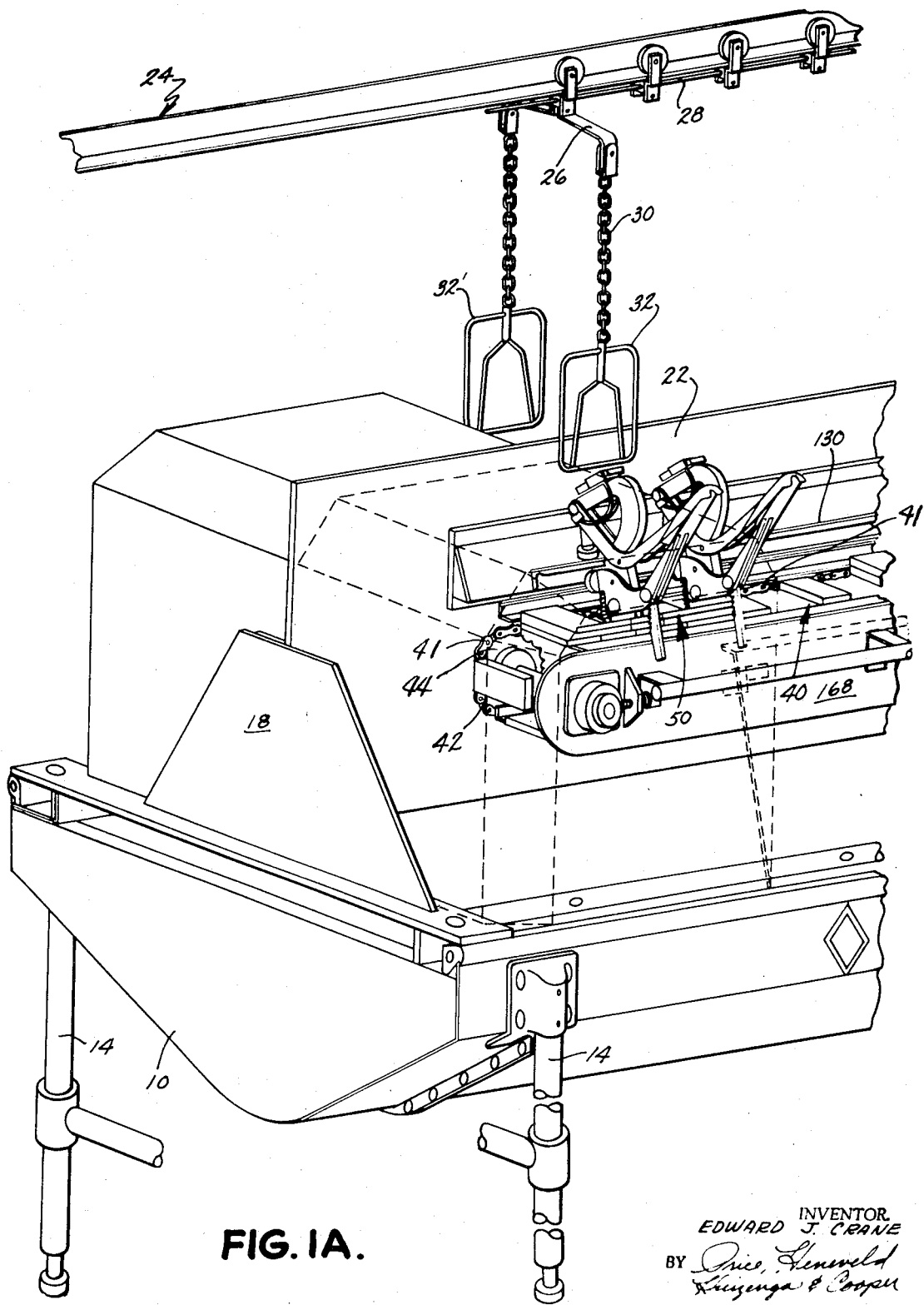
FIG. IA.

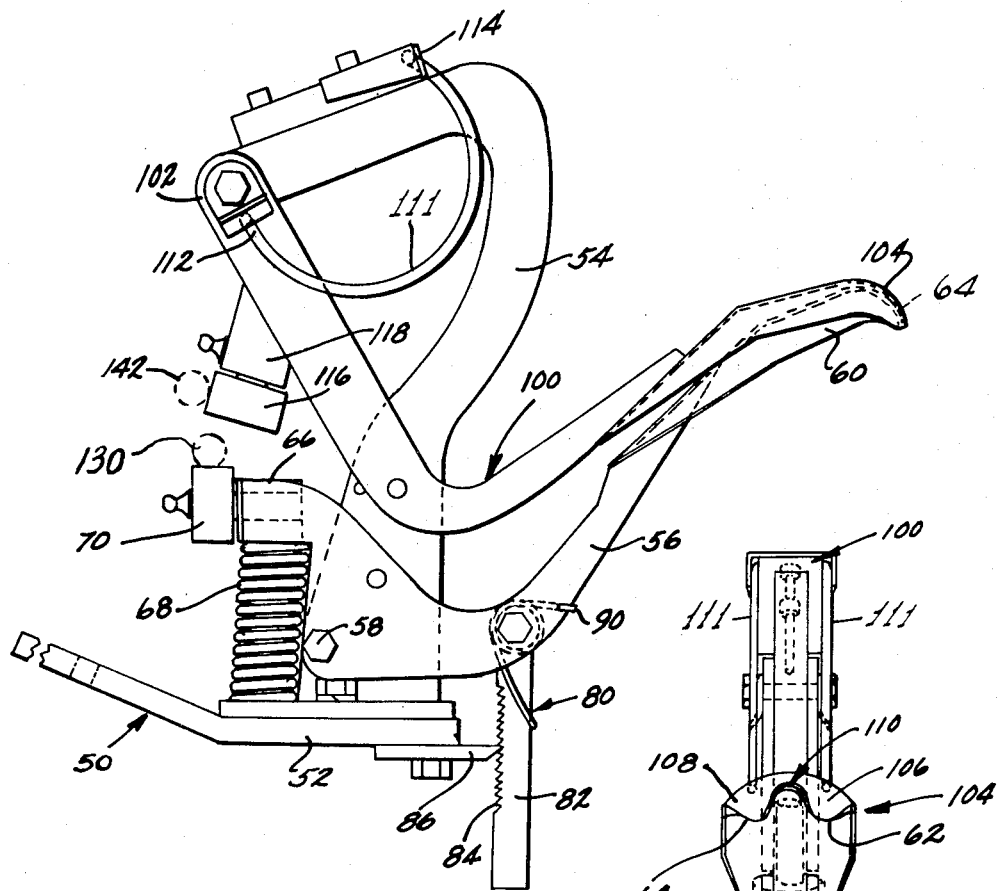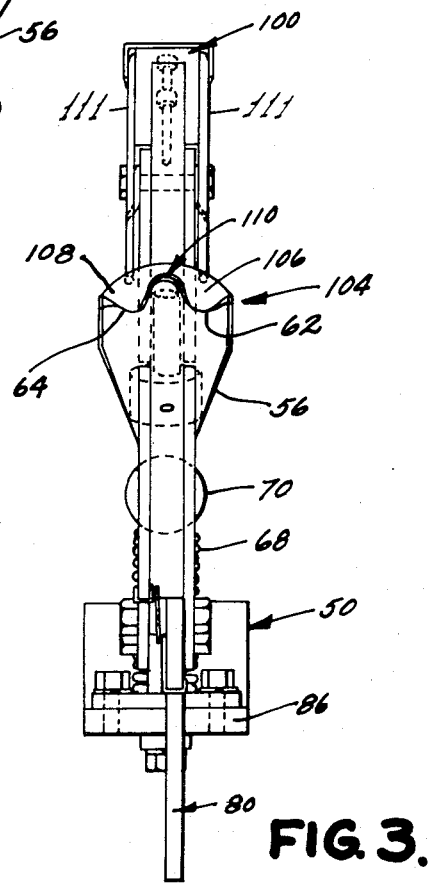

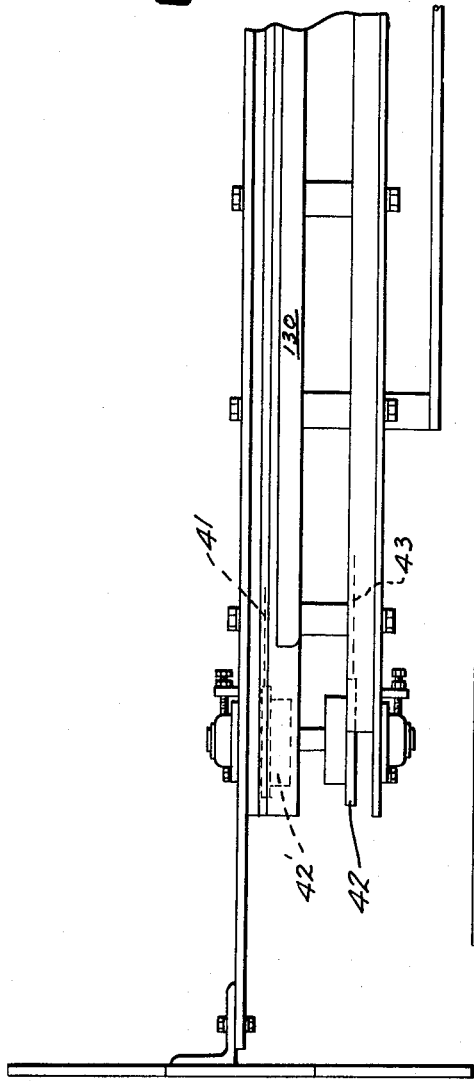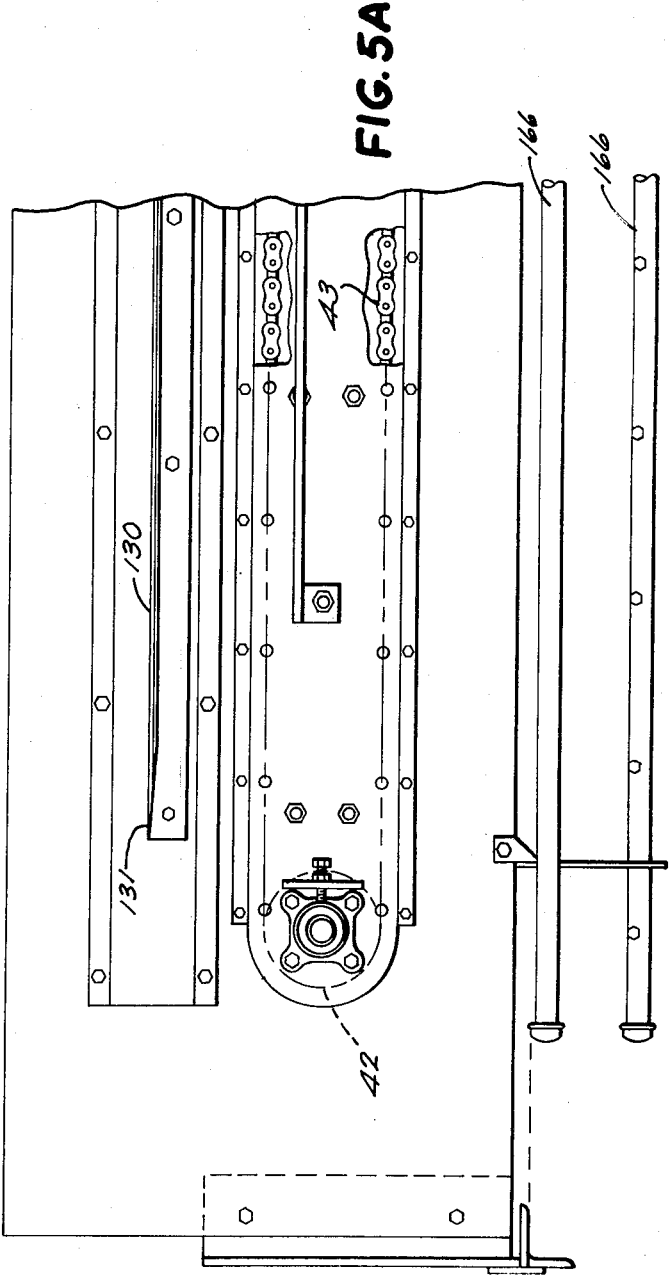

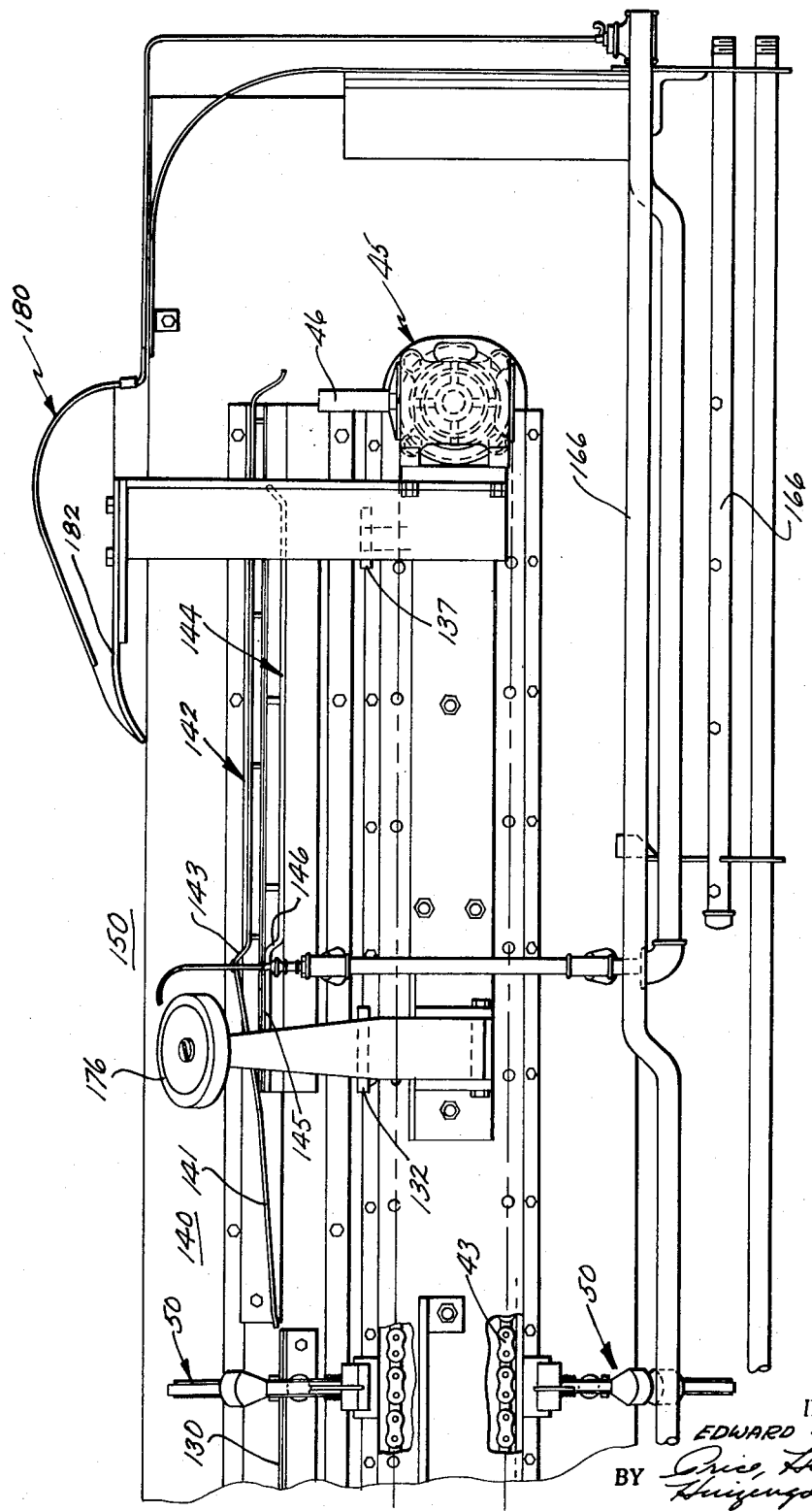

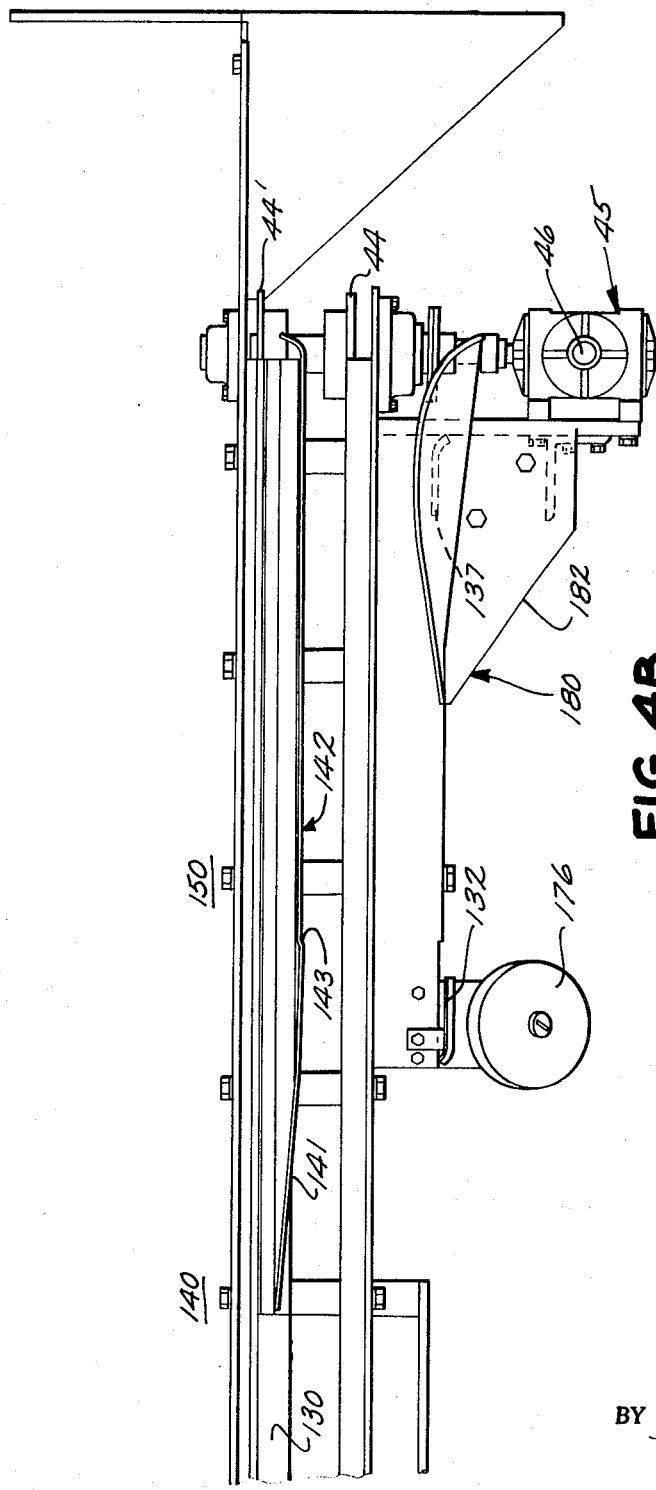

3,689,961

METHOD AND APPARATUS FOR EVISCERATING POULTRY

This application is a continuation-in-part of application Ser. No. 9,180, filed Feb. 6, 1970, now abandoned.

BACKGROUND OF THE INVENTION

In the preparation of poultry, more and more of the processing is being accomplished automatically. However, heretofore, one step which has not been automated is the evisceration of the poultry. Devices have been provided which allow certain handling of the poultry during the evisceration to be accomplished by machine, but by and large these devices have not lent themselves successfully to conveyor line operations. An example of prior art devices is disclosed in U.S. Pat. No. 3,474,492.

It will be further recognized that the problem of automation is further complicated by the fact that the evisceration apparatus must provide sufficient separation of the viscera from the fowl so as to allow the viscera to be inspected but must also provide for keeping track of which particular viscera was removed from which particular bird. That is, the operation which follows the evisceration is the inspection of the viscera, and an accidental severing of the viscera may prevent the inspector from determining if the bird is sound.

SUMMARY OF THE INVENTION

This invention relates to an eviscerating apparatus and method adapted for use in automated processing lines wherein no further manual handling of the fowl is required once the bird is positioned in the apparatus. Specifically, there is provided an improved apparatus and method utilizing means for conveying the fowl along a predetermined path and a pair of opposed spoon-like members mounted on a conveyor for rotation relative to each other, the members being adapted for insertion into the body cavity of the fowl with one member contacting the body and the other member the viscera. The improvement concerns means provided for moving both of the spoon-like members with respect to the conveyor, the moving means including means for initially separating the members from each other at the portions contacting the fowl and the viscera. Thereafter, the moving means moves the portions gradually farther apart and finally partially closes them together so that they are spaced apart a final amount less than the maximum spacing. Means are also provided for automatically lifting the fowl off the members following their final closing, whereby the viscera which has been pulled without severing from the fowl by the spoon-like members can thereafter be inspected.

Accordingly, it is an object of the invention to provide an eviscerating apparatus which is capable of automatically separating the viscera from the fowl in a conveyor line operation.

It is a related object of the invention to provide such apparatus which is sufficiently compact to fit the standard flow-away trough with which it is used.

It is another object of the invention to provide such an apparatus wherein the fowl is removed automatically from the eviscerating apparatus and carried on to the next station in the processing.

Other objects and advantages will become apparent upon reference to the following drawings and detailed discussion.

BRIEF DESCRIPTION OF THE DRAWINGS

FIG. 1A is a fragmentary perspective view of one end of an apparatus constructed in accordance with the invention;

FIG. 2 is a fragmentary side elevational view of the spoon operating mechanism;

FIG. 3 is a front elevational view of the mechanism shown in FIG. 2;

FIG. 4A is a fragmentary plan view of the end of the apparatus shown in FIG. 1A;

FIG. 4B is a fragmentary plan view of the end of the apparatus shown in FIG. 1B;

FIG. 5A is a fragmentary side view of the end of the apparatus shown in FIG. 1A;

FIG. 5B is a fragmentary side view of the end of the apparatus shown in FIG. 1B; and FIGS. 6 and 7 are schematic representations of the manner in which FIGS. 4A and 4B, and FIGS. 5A and 5B, respectively are to be viewed together.

DESCRIPTION OF THE PREFERRED EMBODIMENT

Figure 1B:
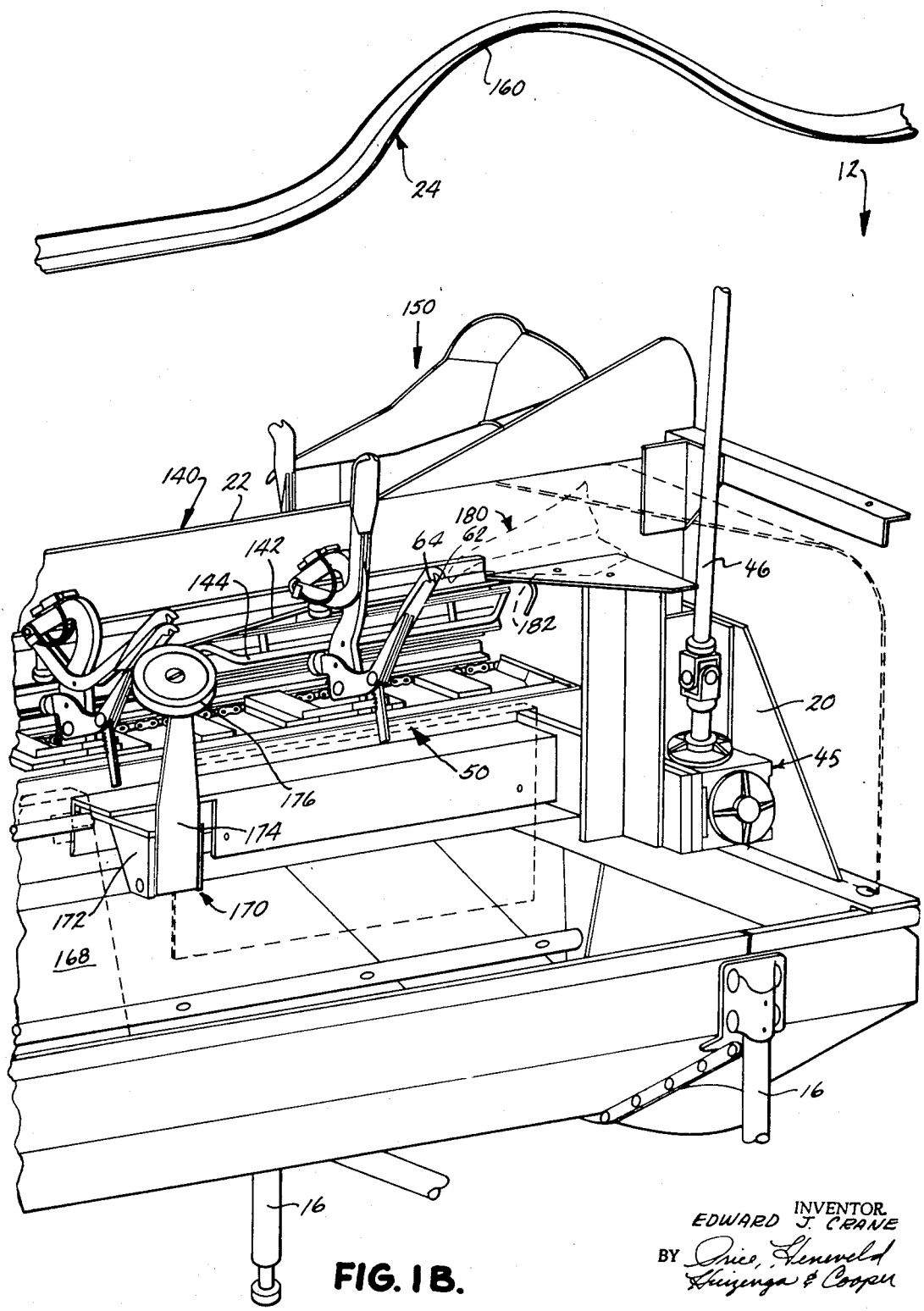
FIG. 1B is a fragmentary perspective view similar to FIG. 1A but of the opposite end of the apparatus.

There is provided by the invention an apparatus for eviscerating fowl in an automated processing plant, the apparatus being especially adapted for use with standard flow-away troughs 10. The fowl is eviscerated by the apparatus positioned above the trough 10, and thereafter carried away to additional stations such as an inspection station 12 without any handling necessary between the evisceration and the inspection.

Referring now to FIGS. 1A and 1B, the flow-away trough 10 is mounted on a floor by means of leg members 14 and 16. Flanges 18 and 20 are mounted at each end of the trough 10, and a divider 22 extends from one flange 18 to the other flange 20 to divide the trough and the eviscerating area into two halves. This division allows evisceration to occur on both sides of the divider 22 at the same time, thus doubling the capacity of the apparatus. To this end there can be provided where necessary "mirror image" structures such as will be discussed in detail with reference to FIGS. 4 and 5 on either side of the apparatus, each such structure handling one-half of the birds on the line.

The fowl are conveyed into the automated processing line including the eviscerating apparatus by a trolley rail 24, individual trolleys 26 being connected by cable members 28 at equal intervals. Each trolley 26 has suspended therefrom by chains 30 two eviscerating shackles 32 and 32', each of which clamps both hocks of the bird to be eviscerated in conventional fashion.

A conveyor 40 consisting of two endless chains 41 and 43 is rotatably suspended between sprockets 42, 42', 44 and 44' at opposite ends of the trough 10 (see additionally FIGS. 4A, 4B, 5A and 5B). The chains 41 and 43 have suspended therebetween at equal intervals a plurality of spoon carriages 50.

The conveyor 40 is synchronized with the trolleys 26 so that the spacing of each of the assemblies 50 and the movement thereof coincides with the spacing and movement of the trolleys 26. Such synchronization can be accomplished most easily, as illustrated, by driving the eviscerator directly from the overhead conveyor. This may be accomplished, as illustrated, by the provision of a right-hand drive 45 and a drive shaft 46 suitably geared to the overhead conveyor. Any change in the speed of the overhead conveyor will be reflected automatically, thus, in the speed of the eviscerating conveyors 40. The movement of the spoon carriages 50 and the trolleys 26, thus, defines a predetermined path for the fowl, as will be apparent hereinafter.

Referring now additionally to FIGS. 2 and 3, each of the spoon carriages 50 comprises a base 52 suspended between and moveable with chains 41 and 43. Base 52 has affixed thereupon an upright, question mark-shaped bracket 54. A lower spoon-like member or shovel 56 is pivotally mounted at 58 to the bracket 54, the pivotal mounting occurring at a point intermediate the ends of the spoon 56. One end of the spoon 56 is provided with the curved spoon surface 60, which as shown in the drawings is curved and has lobes 62 and 64 extending from both sides of the center of the curved surface. The opposite end 66 of the lower spoon 56 has a compression spring 68 abutting thereagainst so as to tend to pivot the lower spoon 56 in a clockwise direction as shown in FIG. 2. The end 66 is also characterized by a cam follower 70 which is rotatably mounted thereto for cooperation with a cam track as hereinafter described.

The lower spoon 56 includes a ratchet and pawl mechanism 80 which limits the clockwise rotation which the lower spoon 56 can experience. Specifically, a ratchet arm 82 is pivoted to the lower spoon 56, the teeth 84 of the ratchet arm cooperating with a pawl 86 bolted to the lower side of the base 52. A spring 90 serves to bias the ratchet arm 82 toward the pawl 86. The teeth on ratchet 82 are sloped such that spoon 56 may be rotated counterclockwise about pivot 58 (FIG. 2) but will resist clockwise rotation so long as pawl 86 is in engagement the ratchet arm.

An upper spoon or shovel-like member 100 is pivotally mounted to the bracket 54 at the end 102 of the spoon member 100. The opposite end 104 of the spoon 100 is curved so as to mate with the surface 60 of the spoon 56. The curved surface 104 has lobes 106 and 108 which are similar to the lobes 62 and 64 of the surface 60. The lobes 106 and 108 are positioned on both sides of the center portion of the surface 104 so as to provide a gap 110 therebetween (FIG. 3) to accommodate the backbone of the fowl as hereinafter described. A spade spring 111 is mounted at one end 112 to the upper spoon 100, while the opposite end 114 is connected to the bracket 54. The spring 111 biases the upper spoon 100 toward the lower spoon 56. A cam follower 116 is rotatably mounted on a shoulder 118 affixed to spoon 100 at a point intermediate the ends 102 and 104 of the upper spoon 100. It will readily be appreciated that each of the spoon carriages 50 can be a duplicate of that shown in FIGS. 2 and 3.

The cam followers 70 and 116 cooperate with cam tracks fixedly mounted with respect to the divider 22. A cam track 130 extends from a position above the sprocket 42' part way along the trough 10 to point 140, that portion of the apparatus upstream from point 140 being the loading station whereat the birds are placed on the spoons in a manner to be described hereinafter. The cam track 130 is designed to accommodate the cam follower 70 by pressing the follower 70 downwardly at 131. The lowering of follower 70 will raise extremity 60 of spoon 56 and the ratchet assembly will thereafter retain this extremity in the position to which it has been raised until disengaged. That portion of cam track 130 beyond the tip 131 is, therefore, somewhat redundant although it insures that spoon 56 will not unexpectedly move because of a failure of the ratchet assembly.

The cam track 130 terminates, as noted, at point 140. Another cam track 142, positioned so as to press outwardly against the cam follower 116, begins at point 140. The cam track 142 is characterized by a track portion 141 which extends initially away and up from the divider 22 as the spoon carriage 50 moves toward the end of the trough 10 defined by the flange 20. The effect is to cause the upper spoon 100 to rotate counterclockwise from the position shown in FIG. 2, due to the outward movement of the follower 116.

The initial upward movement of spoon 100 forces the bird upwardly against the downward spring bias of spoon 56. The spring 68 functions, during this period, to control the amount of tension placed on the viscera of the birds to insure that the same will not be torn. If, for example, the bird is extremely tough and the viscera difficult to remove therefrom, the lower spoon may be pulled slightly upward during this initial period of spoon separation. Such movement, of course, will aid in a uniform separation of the viscera from the body cavity of the birds. The bird with the spoons therein initially separated is then conveyed adjacent the roller assembly.

The roller assembly 170 is positioned downstream from point 140 in the approximate position illustrated. The roller 170 comprises a bracket 172 to which is hinged an arm 174. The arm 174 has rotatably mounted at the end opposite to the hinged end a tire or wheel 176. The arm 174 is spring biased so as to press toward the spoon members when the latter are positioned at the station 140. The roller 170 thus acts as a stop against which the fowl presses so that the downward motion of the lower spoon 56 results in positive engagement of the teeth 62 and 64 with the viscera, rather than a mere pivotal movement of the fowl outwardly as would be the case without the stop.

Simultaneous with the passage of the bird behind roller 176, the ratchet arm 82 is tripped free from pawl 86 by cam 132 permitting spring 68 to force spoon 56 clockwise (FIG. 2) to the extent permitted by wheel or roller 176 and spring 68. Such movement of spoon 56 causes its spoon-like extremity to positively engage the viscera.

As the spoon assembly passes behind roller 176 and the lower spoon snaps down, cam follower 70 comes under cam surface 145 of cam 144. After passage of the spoon assembly behind the roller, cam 144 dips rather sharply downwardly at 146 causing the lower spoon 56 to rotate counterclockwise (FIG. 2) raising surface 60 upwardly. As spoon 56 is so rotated, ratchet assembly 80 engages to retain it in the maximum raised position.

Almost simultaneous with the raising of spoon surface 60, cam follower 116 engages surface 143 of cam 142 which permits spoon surface 104 to lower somewhat. Spoon surface 104 has been raising constantly to this point and evisceration is virtually completed. As the two spoon surfaces relax towards each other at point 150 the pressure on the cavity of the birds is released, allowing the fowl to be removed from the spoons as hereinafter described.

In accordance with another aspect of the invention, the trolley rail 24 is provided with a vertical lift in conjunction with the location of the cam tracks 142 and 144. That is, the portion 160 (FIG. 1B) elevates at a rate which until the station 150 is reached, serves to keep the fowl taut on the spoons 56 and 100 so as to insure the proper evisceration of the bird. At the uppermost portion of the peak 160, the rail 24 rises above the level necessary to convey the fowl in its surrounding relationship with the spoon members, this portion of the rail occurring after the station or point 150 previously described is reached by the carriages 50. The result is that the bird is automatically lifted off the spoon members 56 and 100 which, by the action of the cam surfaces 143 and 146 at station 150, have been partially closed so as to loosen the fowl upon those spoon members.

A plow 180 is mounted along the path traveled by the fowl upon the spoon members 56 and 100 in such a position as to be immediately above the spoon 56 shortly after station 150 is passed. The plow (shown in dotted lines in FIG. 1B) is characterized by a scraping edge 182 extending horizontally from the main body 184 thereof, which edge functions to scrape or guide the viscera free from its engagement with lower spoon 56. The viscera is then carried with the bird to the inspection station where it can be inspected and the giblets removed therefrom. Such carriage is made possible by the tendency of the viscera to remain attached to the bird even though it has been withdrawn from the body cavity thereof. The membranes, etc., which effect such attachment can be snipped for final separation after inspection.

As the bird is removed from the spoons the ratchet assembly 80 prevents the lower spoon surface from snapping downwardly under the influence of compression spring 68 to tear the viscera away from the fowl and throw the same downwardly onto the floor. The ratchet assembly is released after withdrawal of the bird and viscera from the spoon assemblies by cam trip 137 permitting spoon surfaces 60 and 104 to separate for washing purposes on the return trip to the loading station.

Panels 168 are provided below and around the conveyor 40 to enclose the trough below the conveyor. The portions enclosed by the panels 168 serve to confine the cleaning apparatus which sprays and washes the spoon members 56 and 100 as they pass upside down in their return from the sprocket 44 to the sprocket 42.

Although the invention has been described in conjunction with only one side of the apparatus, namely that located in front of the divider 22 as seen in FIGS. 1A and 1B, it will be readily appreciated that a duplicate arrangement is provided on the far side. That is, duplicate spoon carriages, conveyors and cams may be connected to the opposite side of the framework to eviscerate a second line of fowl carried by the shackles 32' on the rail 24.

OPERATION

A fowl to be eviscerated is slit at the bottom thereof and inserted over the spoon members 56 and 100 positioned at the end of the trough 10 adjacent to the flange 18. At this position, the spoon members are mated together, the lower spoon member being held rigid by ratchet assembly 80 as previously described. The spoon members 56 and 100 are positioned internally of the bird so that the surface 104 of the upper spoon 100 rests against the boundary of the body cavity. Loading of the spoon members is accomplished along that portion of the apparatus preceding station 140, it being contemplated that in most situations two loaders will be utilized on each side of the apparatus.

At the station 140, the spoon members 56 and 100 begin separating when the cam follower 116 engages track 141. This initial separation is encouraged by the spring 68 although, as noted previously, its characteristics are such as to permit spoon 56 to raise if the bird is being over stressed and any such raising will be retained by ratchet 80.

The spoon assembly then passes behind roller 176 and cam 132 trips ratchet assembly 80. The spring 68 forces the lower spoon 56 to pivot clockwise as shown in FIG. 2. The lower spoon 56 rotates far enough to positively engage the viscera, the roller 170 serving to hold the fowl in place during the outward and downward rotation of the spoon 56.

Spoon 100, during and immediately after this period, is continuing its upward counterclockwise movement due to the continuing divergence of track 141 from the centerline of the apparatus. This causes the curved surfaces 60 and 104 to incur further separation thus causing the viscera to move out the slit of the fowl. The spoons then converge due to the contact of followers 116 and 70 with cam surfaces 143 and 146, respectively, relaxing the pressure within the body cavity of the fowl.

During the engagement of the followers 116 and 70 by the cam tracks 142 and 144, the ratchet 82 is engaged again by the pawl due to the bias of the spring 90. At this point, the ratchet is needed to prevent snapback of the lower spoon which would otherwise occur whenever the lower spoon is caused to rise due to the pressure exerted upon the bird by the rising upper spoon. That is, such pressure occasionally causes the follower 70 to drop below the cam track 144 momentarily. Without the ratchet to take up the slack, the lower spoon would snap down when the pressure is relieved, thus tending to rip loose the viscera and possibly throw the same to the floor as discussed previously.

When the carriage 50 carrying a particular fowl reaches station 150, the plow 180 is positioned above the lower spoon 56 so as to scrape or guide the viscera off that spoon. At this point, the track 142 retreats toward the divider 22 and the track 140 lowers, causing the springs 110 and 68 to force the upper spoon 100 and lower spoon 56 to retrace part of their rotation, thus partially closing together the two spoon members so as to be spaced apart a final amount which is less than the maximum spacing immediately preceding station 150. For this reason, the fowl only loosely fits the spoon members 56 and 100 at station 150 and beyond. It is also at station 150 that the rate of elevation of the portion 160 of the rail 24 starts to exceed that which is necessary to keep the fowl in a taut condition on the spoon members, thus causing the fowl to be raised off the spoons. This action is simultaneous with the scraping of the viscera off the spoon surface 60 by the action of the plow 180.

The spoons separate for the return trip to the loading station due to cam 137 disengaging ratchet assembly 80. During this return trip the spoons are thoroughly washed by cleaning fluid issuing from pipes 166 and repositioned for loading by engagement with cam surface 131.

It will be readily appreciated that due to the rotation of both of the spoon members rather than just one, the actual distance moved by any one of the spoons is lessened. This coupled with the fact that the motion of the spoons is predominantly vertical with respect to the trough 10 allows the apparatus to be compactly constructed in a manner permitting the apparatus to be combined with a standard sized flow-away trough 10.

It will also be appreciated that the invention provides a firm but flexible separation of the spoon members, insuring that the viscera is forced out of the bird rather than severed. For example, the stop provided by roller 170, while serving to abut against the fowl to aid in the engagement of the viscera by spoon 56, nevertheless permits some give due to the spring bias thereof, thus insuring that the spoon 56 does not engage so sharply as to sever the viscera.

Although the invention has been disclosed in connection with a preferred embodiment, it is not intended that it be so limited. Rather, it is intended to cover all alternatives, equivalents, and alternate embodiments as may be included within the scope of the following claims.

The embodiments of the invention in which an exclusive property or privilege is claimed are defined as follows:

1. In an eviscerating apparatus including means for conveying a fowl along a predetermined path and a pair of nestable, spoon-like members mounted on a conveyor for movement with said conveyor means, said members being adapted for insertion in nested fashion into the body cavity of the fowl between the viscera and the cavity boundary and thereafter being adapted for relative movement with respect to one another to remove the viscera from the cavity, the improvement comprising each of said members being moveably mounted with respect to said conveyor and means for moving each such member with respect to one another and with respect to said conveyor to effect removal of the viscera, said moving means including means for initially separating said members from each other at the portions contacting the cavity boundary and the viscera by movement of one of said members, thereafter moving the other of said members to move said portions farther apart, and finally partially closing said members together so that they are spaced apart a final amount less than their maximum spacing, whereby the viscera is pulled from the cavity of the fowl and said fowl is thereafter loosened from said members.

2. The improved apparatus as defined in claim 1, and further including means for automatically lifting the fowl off said members following said final partial closing of said members.

3. The improved apparatus as defined in claim 2, wherein said lifting means includes a portion of said conveying means which is elevated well above the level necessary to convey the fowl in a surrounding relationship with said members.

4. The improved apparatus as defined in claim 1 wherein said separating, moving, and closing means include at least one cam track and a cam follower for each of said members, said followers being mounted on each said member.

5. The improved apparatus as defined in claim 4, wherein one of said members is pivotally mounted on said conveyor at a point intermediate the fowl-engaging portion thereof and the follower engaging end thereof, and the other of said members is pivotally mounted on said conveyor at one end with said follower attached at a point intermediate the ends of said other member.

6. The improved apparatus as defined in claim 1, and further including means positioned along said path for pushing the viscera off said other member, said pushing means being positioned so as to pass above the viscera-contacting member after said point of final separation.

7. the improved apparatus as defined in claim 1 and further including a holding member adjustably positioned adjacent to the path of travel of said members and especially adapted to press the outside surface of the fowl and hold it in place during at least portions of the movement of said spoon-like members with respect to one another.

8. In an eviscerating apparatus including means for conveying a fowl along a predetermined path and a pair of nestable, spoon-like members mounted on a conveyor for movement with said conveyor means, said members being adapted for insertion in nested fashion into the body cavity of a fowl between the viscera and the body cavity boundary and thereafter being adapted for relative movement with respect to one another to remove the viscera from the body cavity, the improvement comprising: an upright support affixed to said conveyor for movement therewith, each of said members being pivotably mounted on said support; and spring means biasing each of said members in a predetermined pivotal direction with respect to said support.

9. The apparatus as set forth in claim 8 which further comprises cam means and cam follower means on said members and along said predetermined path for selectively overcoming the influence of said spring means and maintaining said members at desired positions relative to one another and to said support.

10. The apparatus as set forth in claim 9 wherein said spring means bias each of said members in the same pivotal direction with respect to said support.

11. The apparatus as set forth in claim 10 wherein said conveyor is positioned generally below said conveyor means an wherein said spoon-like members are biased generally downwardly by said spring means.

12. A method of eviscerating a bird which is conveyed along a predetermined path by an overhead conveyor, said method having the steps of: inserting a pair of nested, spoon-like members into the body cavity of the bird between the viscera and the body cavity boundary thereof; moving said members along said predetermined path at a rate of speed generally equal to the speed of said overhead conveyor; and, moving each of said members in diverging, curved directions with respect to one another in accordance with a predetermined scheme to at least partially eviscerate said bird while retaining both of said members within the body cavity of said bird; moving said members while both are within the body cavity of said bird in converging directions with respect to one another such that the bird thereafter loosely fits over said members; and withdrawing said members from said bird.

13. The method as set forth in claim 12 which further comprises the step of increasing the vertical distance between said overhead conveyor and said members after the latter have converged to withdraw said members from said bird.

14. A method of eviscerating poultry by the use of a pair of nestable, shovel-like members adapted to be inserted into the body cavity of a fowl between the viscera and the interior body cavity boundary thereof, said method having the steps of: nesting said members together; inserting said members into the body cavity; separating said members by moving at least one such member with respect to the other in a first direction; resiliently restraining the other such member from movement in such first direction during the separating step but permitting the same to move with said one member in such first direction in the event the strain exerted on the bird by the separating step exceeds a predetermined amount.

15. An eviscerating apparatus comprising: means for conveying a fowl along a predetermined path; a pair of nestable, spoon-like members mounted on a conveyor for movement with said conveyor means, said members being adapted for insertion in nested fashion into the body cavity of the fowl between the viscera and the cavity boundary and thereafter being adapted for relative movement with respect to one another to remove the viscera from the cavity, each said members being moveably mounted with respect to said conveyor; means for moving at least one member with respect to the other in a first direction; and, means for restraining the other such member from movement in said first direction but permitting the same to move with said one member in such first direction in the event the strain on the fowl exceeds a predetermined amount.

16. The apparatus as set forth in claim 15 wherein said restraining means comprises a spring.

* * * * *